Aug. 13, 1929.  M. HERZBERG  1,724,875
METHOD OF MAKING REPRODUCING PLATES
Filed Feb. 26, 1926  3 Sheets-Sheet 1

INVENTOR
Max Herzberg
BY
Meyer Warfield & Watson
ATTORNEYS

Aug. 13, 1929.  M. HERZBERG  1,724,875
METHOD OF MAKING REPRODUCING PLATES
Filed Feb. 26, 1926  3 Sheets-Sheet 2

INVENTOR
Max Herzberg
BY
Mayer Warfield & Watson
ATTORNEYS

Aug. 13, 1929. M. HERZBERG 1,724,875
METHOD OF MAKING REPRODUCING PLATES
Filed Feb. 26, 1926  3 Sheets-Sheet 3

INVENTOR
Max Herzberg
BY
Mayer Warfield Wilson
ATTORNEYS

Patented Aug. 13, 1929.

1,724,875

UNITED STATES PATENT OFFICE.

MAX HERZBERG, OF NEW YORK, N. Y., ASSIGNOR TO EXCELLA PATTERN COMPANY, INC., OF NEW YORK, N. Y., A CORPORATION OF NEW YORK.

METHOD OF MAKING REPRODUCING PLATES.

Application filed February 26, 1926. Serial No. 91,002.

This invention relates to an improved method of making reproducing plates.

It is generally an object of this invention to present a method which may be practiced with facility, by means of which the character of the finished work will be improved, and in which the expense incident to the production of the finished work will be decreased.

A further object of the invention is that of teaching a method by the practice of which reliable reproductions may be made in an improved manner and within any definite and desired limits.

Still another object is that of furnishing improved articles, such as sheets and plates, capable of production by means of certain steps exemplified in the method, and which articles may be employed in the practice of one or more steps of the method.

Specifically, considering the invention in the light of the pattern industry, it is an additional object to provide an improved method by means of which plates for printing pattern blanket sheets may be advantageously produced.

Other objects of the invention will in part be obvious and will in part appear hereinafter.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention reference should be had to the following detailed description taken in connection with the accompanying drawings, in which.

Figure 4:
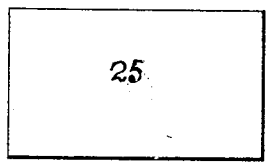
Figure 6:
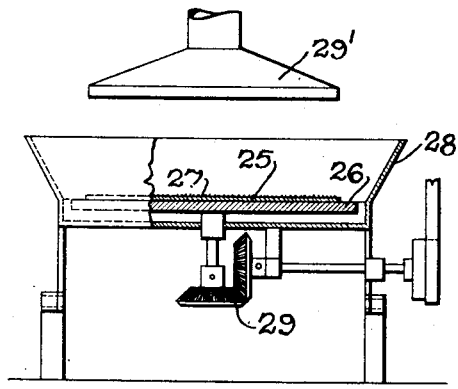
Figure 5:
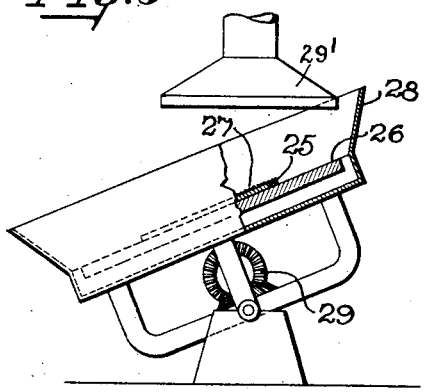
Figure 7:
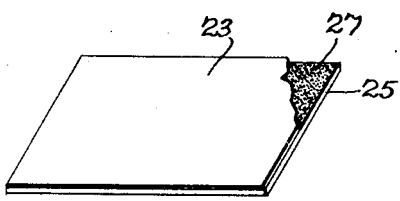
Figure 8:
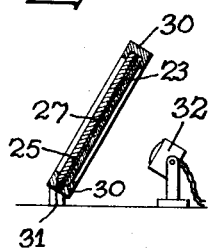
Figure 9:
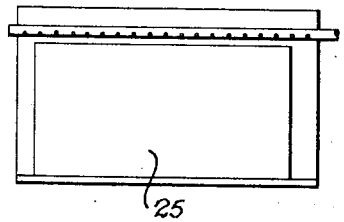

Figs. 4 to 9 inclusive illustrate diagrammatically certain steps of the method involved in the present invention,—Fig. 4 illustrating the printing plate; Fig. 5, the application of a sensitized solution to this plate; Fig. 6, the fixing of such solution; Fig. 7, the application of the transparent sheet to the sensitized plate; Fig. 8, the exposure of the plate, and Fig. 9, the washing and etching thereof.

The method involved in the present case finds one of its applications in the production of a plate by means of which a blanket sheet such as has been illustrated in the co-pending application Serial No. 721,652, may be printed. At this time it is to be understood that while the present invention is particularly useful in the connection aforenamed, it will likewise be useful in connection with the production of articles other than blanket sheets, and that certain steps of the method may also be independently employed.

For the sake of conciseness, however, the invention will be described with particular reference to the art of pattern production, and specifically, plates by means of which blanket sheets preferably of an improved type may be printed.

Figure 1:
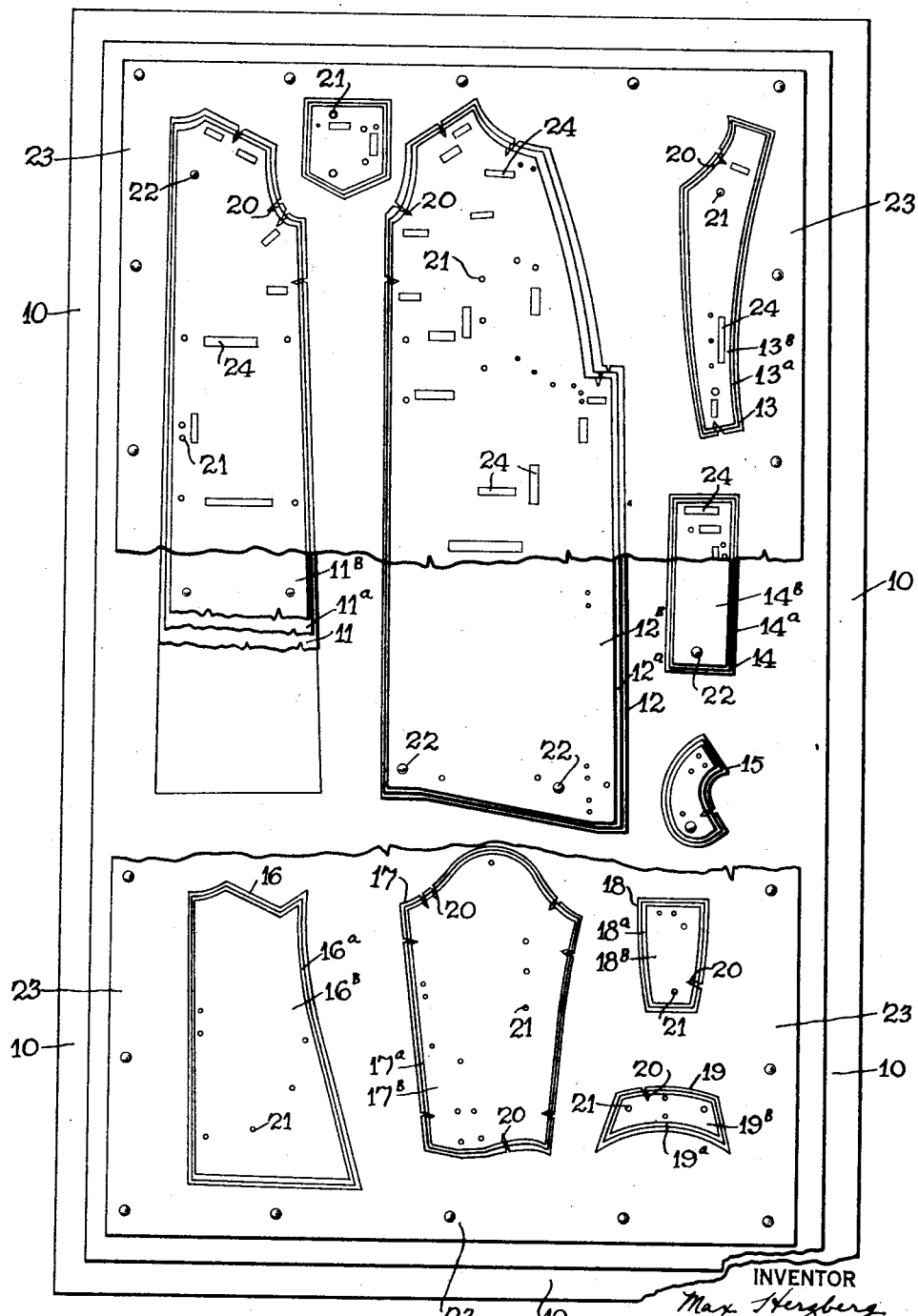
Fig. 1 is plan view of a table with master patterns placed thereon and with a sheet of transparent material applied over these patterns.
Figure 2:
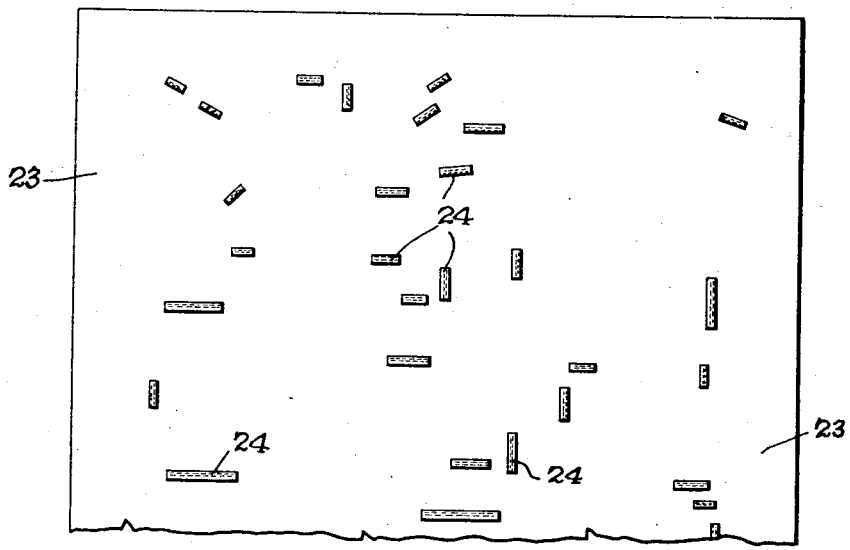
Fig. 2 is a fragmentary face view of the upper portion of the transparent sheet showing the same removed from the table and patterns.
Figure 3:
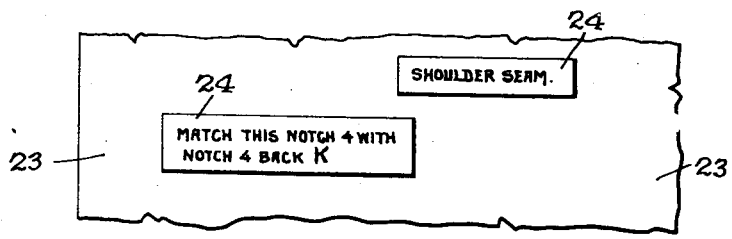
Fig. 3 is an enlarged fragmentary view thereof.

Thus, referring primarily to Figs. 1 to 3, it will be observed that a table or a deck 10 is utilized, upon which the sections of a pattern set are distributed to best advantage. These sections may each be master patterns, and have been indicated by the numerals 11 to 19 inclusive. If the invention as taught in the prior application previously referred to is to be practiced, these sections will each be of the largest size, and a second set of similar sections $11^a$ to $19^a$ inclusive will be arranged upon the first set, and, a third set $11^b$ to $19^b$ inclusive, will be in turn arranged upon the second set. Thus, three sets of corresponding pattern sections will be disposed upon the table 10, with the largest set adjacent the table, and the smallest set uppermost. Care will of course be taken to superpose the various sections of each pile in such a manner that the several and corresponding notches and key-marks 20, 21, respectively, are in proper relationship. When thus disposed the sections may be retained in their proper relative positions by any suitable means, such, as for example, thumb tacks 22, so that a sheet of transparent material 23 may be disposed above the uppermost set 11$^b$ to 19$^b$ inclusive without disturbing the relationship of the parts.

This sheet of material, while it may be of any desired character, is preferably of what is commonly termed "onion skin", which possesses the characteristics of transparency, flexibility and toughness; and upon this sheet being secured in position the outline of the largest sections 11, to 19 inclusive, may be traced upon the surface of the same in order to assure the greatest accuracy.

Although the sheet 23 may now be removed from the table, it is preferred that the same be permitted to remain in applied position while indicia-bearing strips are associated therewith. These strips are also of transparent material, and have been indicated by the numeral 24. They are arranged adjacent the notches, etc., 20, and, as in Fig. 3, the strips bear printed instructions interpretive of these marks. By this expedient the desired indicia may readily be associated with the sheet 23, and at this time it is to be understood that the strips are retained in this association in any suitable manner, as, for example, by the use of a transparent glue.

The sheet is now removed from the deck or table 10, and the pattern sets may likewise be removed, the former being subsequently applied to a sensitized plate, the preparation of which may be as follows: This plate (Fig. 4) is preferably of metal, and has been indicated by the numeral 25. After the plate has been thoroughly cleaned in any desired manner it is placed upon a platform 26 (Fig. 5) suitably mounted so as to be capable of being titled in various directions. After the platform and plate have been tilted to an angle of approximately 45° a light-sensitive collodion solution is flowed over the former, and the plate is tilted at various angles so as to insure a distribution of this solution in the form of an even layer 27. The platform 26 preferably forms a part of a whirler (Fig. 6), which includes a receptacle body 28 and a drive mechanism 29, by means of which the platform may be rapidly turned. This driving mechanism is now set in operation in order to assure evenness of the light-sensitive layer, and, if desired, the upper face of the plate may be subjected to a blast of hot air by means of a hood 29'.

The sheet of transparent material is now placed upon the sensitized face of the plate (Fig. 7), and the latter is mounted within a frame 30 (Fig. 8). While this frame may be of any desired character, it is preferable that the same have a source of suction 31 in communication with the space which may be extant between the adjacent faces of the sheet and plate so as to draw these faces into intimate contact to prevent any distortion or blurring in the resultant exposure. The rays from a source of illumination 32 are now directed through the transparent sheet 23 and against the sensitized surface 27 of the plate, resulting in the exposure of the latter.

The plate is now washed (Fig. 9) with a suitable liquid so that the unexposed portions of the light-sensitive collodion film are removed therefrom. The portions of the plate surface thus bared may now be etched by a suitable solution, for example, an acidified iron solution. Subsequently, the plate is again washed and dried, if desired, and grease is applied thereto, after which the remaining glue is scrubbed from the plate, and the latter is again etched and prepared for a press.

It will be appreciated that the plate will be of positive nature, and in order that the printing accomplished by the same may also be of a positive nature it is preferred that the mechanism utilized to accomplish such printing be in the nature of an offset press of more or less conventional construction.

It will be understood that according to the present exemplification of the invention a method is defined by means of which pattern blanket sheets may be readily produced, and, if desired, these blanket sheets as taught in the application previously referred to may be of such nature that different groups of similar blanket sheets may be subdivided into sets of pattern sections of corresponding type but different dimensions, so that pattern sets for the production of differently sized garments may be readily produced by the use of but a single plate. It will be appreciated that the indicia, i. e., the instructions or indicating-marks, upon the strips 24 will be carried over upon the blanket sheet within an area defined by the smallest pattern section and adjacent the manipulating mark of which these indicia are interpretive.

Thus, among others, the objects of this invention are accomplished, and since certain changes in carrying out the above method, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. The method of preparing a sheet from which a plate for use in pattern manufacture is to be produced, such method including disposing a master pattern below a sheet of transparent material and applying indicia to said sheet within the areas defined by said master pattern and overlying portions of said pattern at which reproductions thereof are to be manipulated, such indicia being opaque and descriptive of such manipulations.

2. The method of preparing a sheet from which a plate for use in pattern manufacture is to be produced, such method including disposing a plurality of differently-sized and similarly-shaped patterns one upon the other and with the largest in lowermost position, arranging a sheet of transparent material above the uppermost pattern and associating indicia with said sheet and within the area defined by the smallest pattern, such indicia being arranged to overlie portions of said pattern at which reproductions thereof are to be manipulated, and such indicia being opaque and descriptive of such manipulations.

In testimony whereof I affix my signature.

M. HERZBERG.